(12) United States Patent
Kuhlmann et al.

(10) Patent No.: US 10,648,810 B2
(45) Date of Patent: May 12, 2020

(54) ROTATION RATE SENSOR WITH MULTIPLE EVALUATION DURING OPERATION AT SEVERAL FREQUENCIES

(71) Applicant: Robert Bosch GmbH, Stuttgart (DE)

(72) Inventors: Burkhard Kuhlmann, Reutlingen (DE); Thorsten Balslink, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 15/743,058

(22) PCT Filed: May 24, 2016

(86) PCT No.: PCT/EP2016/061704
§ 371 (c)(1),
(2) Date: Jan. 9, 2018

(87) PCT Pub. No.: WO2017/012745
PCT Pub. Date: Jan. 26, 2017

(65) Prior Publication Data
US 2018/0195863 A1    Jul. 12, 2018

(30) Foreign Application Priority Data

Jul. 17, 2015  (DE) .......................... 10 2015 213 469

(51) Int. Cl.
*G01C 19/5726* (2012.01)
*G01C 19/574* (2012.01)
*G01C 19/5747* (2012.01)

(52) U.S. Cl.
CPC ....... *G01C 19/5726* (2013.01); *G01C 19/574* (2013.01); *G01C 19/5747* (2013.01)

(58) Field of Classification Search
CPC .............. G01C 19/5726; G01C 19/574; G01C 19/5712; G01C 19/5719; G01C 19/5621; G01C 19/5747
See application file for complete search history.

(56) References Cited

U.S. PATENT DOCUMENTS

2005/0066726 A1* 3/2005 Mochida ............ G01C 19/5719
73/504.14
2006/0230831 A1* 10/2006 Berke ................ G01N 29/0645
73/602

(Continued)

FOREIGN PATENT DOCUMENTS

DE    102007030119 A1    1/2009
EP       1519149 A1    3/2005

OTHER PUBLICATIONS

International Search Report dated Aug. 22, 2016 of the corresponding International Application PCT/EP2016/061704 filed May 24, 2016.

*Primary Examiner* — Helen C Kwok
(74) *Attorney, Agent, or Firm* — Norton Rose Fulbright US LLP; Gerard Messina

(57) ABSTRACT

A rotation rate sensor includes first, second, third and fourth structures that are each movable relative to a substrate, a drive device configured to deflect each of the first, second, third, and fourth structures essentially parallel to a drive direction and out of respective resting positions of the first, second, third, and fourth structures, such that, at a first frequency, the first and fourth structures are excitable to an oscillation that is essentially in-phase relative to each other and essentially in phase-opposition relative to the second and third structures, and, at a second frequency, the first and second structures are excitable to an oscillation that is essentially in-phase relative to each other and essentially in phase-opposition relative to the third and fourth structures.

9 Claims, 2 Drawing Sheets

(56) References Cited

U.S. PATENT DOCUMENTS

| | | | | |
|---|---|---|---|---|
| 2010/0116050 A1* | 5/2010 | Wolfram | ............... | G01C 19/574 |
| | | | | 73/504.12 |
| 2010/0313657 A1* | 12/2010 | Trusov | ................ | G01C 19/5719 |
| | | | | 73/504.16 |
| 2012/0060604 A1* | 3/2012 | Neul | ..................... | G01C 19/574 |
| | | | | 73/504.12 |
| 2012/0125099 A1* | 5/2012 | Scheben | ............ | G01C 19/5747 |
| | | | | 73/504.12 |
| 2014/0260610 A1* | 9/2014 | McNeil | .............. | G01C 19/5712 |
| | | | | 73/504.12 |
| 2014/0260615 A1* | 9/2014 | Simon | ................... | G01P 15/097 |
| | | | | 73/514.29 |
| 2015/0330783 A1* | 11/2015 | Rocchi | ............... | G01C 19/5747 |
| | | | | 73/504.12 |
| 2018/0172445 A1* | 6/2018 | Prikhodko | ............ | G01C 19/574 |
| 2018/0172446 A1* | 6/2018 | Prikhodko | ............ | G01C 19/567 |

* cited by examiner

ROTATION RATE SENSOR WITH MULTIPLE EVALUATION DURING OPERATION AT SEVERAL FREQUENCIES

CROSS-REFERENCE TO RELATED APPLICATIONS

The present application is the national stage of International Pat. App. No. PCT/EP2016/061704 filed May 24, 2016, and claims priority under 35 U.S.C. § 119 to DE 10 2015 213 469.5, filed in the Federal Republic of Germany on Jul. 17, 2015, the content of each of which are incorporated herein by reference in their entireties.

FIELD OF THE INVENTION

The present invention is directed to a rotation rate sensor.

BACKGROUND

Rotation rate sensors include, for example, a drive device for deflecting a first structure out of a resting position of the first structure essentially parallel to a drive direction, for deflecting a second structure out of a resting position of the second structure essentially parallel to the drive direction, for deflecting a third structure out of a resting position of the third structure essentially parallel to the drive direction, and for deflecting a fourth structure out of a resting position of the fourth structure essentially parallel to the drive direction in such a way that at a first frequency, the first structure and the fourth structure are excitable to an essentially in-phase oscillation with regard to each other and to an oscillation essentially in phase opposition with regard to the second structure and to the third structure.

SUMMARY

An advantage of a rotation rate sensor according to the present invention and of a method for its operation is that the rotation rate sensor provides, in a simple, mechanically robust, and cost-effective manner, an increased certainty of detected rotation rates about one axis of rotation or about multiple axes of rotation which run perpendicularly with respect to each other. This is achieved in that, in contrast to the related art, at a second frequency, the first structure and the second structure are excitable to an essentially in-phase oscillation with regard to each other and to an oscillation essentially in phase opposition with regard to the third structure and to the fourth structure. In particular, the first structure, the second structure, the third structure, and the fourth structure of the rotation rate sensor according to an example embodiment of the present invention are simultaneously excitable at the first frequency and at the second frequency. In this way, an increased certainty of detected rotation rates about one axis of rotation or about multiple axes of rotation which run perpendicularly with respect to each other is made possible by checking the plausibility of the ascertained rotation rates.

Advantageous embodiments and refinements of the present invention may be derived from the description with reference to the drawings.

According to an example embodiment, the rotation rate sensor includes a first detection unit for detecting a first force action on the first structure along a direction which is essentially parallel to a first axis which is essentially perpendicular to the main extension plane, a second detection unit for detecting a second force action on the second structure along a direction which is essentially parallel to the first axis, a third detection unit for detecting a third force action on the third structure along a direction which is essentially parallel to the first axis, and a fourth detection unit for detecting a fourth force action on the fourth structure along a direction which is essentially parallel to the first axis, the first force action, the second force action, the third force action, and the fourth force action being effectuated as a result of a rotation rate of the rotation rate sensor about an axis which is essentially parallel to a second axis which is essentially parallel to the main extension plane and essentially perpendicular to the drive direction. It is thus advantageously made possible that a rotation rate about an axis which is essentially parallel to the second axis is detectable.

According to an example embodiment, the first detection unit includes at least one first electrode for detecting the first force action on the first structure, the second detection unit includes at least one second electrode for detecting the second force action on the second structure, the third detection unit includes at least one third electrode for detecting the third force action on the third structure, and the fourth detection unit includes at least one fourth electrode for detecting the fourth force action on the fourth structure, the first electrode, the second electrode, the third electrode, and the fourth electrode being essentially plate-shaped, the first electrode, the second electrode, the third electrode, and the fourth electrode extending essentially parallel to the main extension plane and being situated at least partially between the substrate and the respective structure. It is thus advantageously made possible that the first force action, the second force action, the third force action, and the fourth force action are capacitively detectable.

According to an example embodiment, the rotation rate sensor includes a further first detection unit for detecting a further first force action on the first structure along a direction which is essentially parallel to a second axis which is essentially parallel to the main extension plane and essentially perpendicular to the drive direction, a further second detection unit for detecting a further second force action on the second structure along a direction which is essentially parallel to the second axis, a further third detection unit for detecting a further third force action on the third structure along a direction which is essentially parallel to the second axis, and a further fourth detection unit for detecting a further fourth force action on the fourth structure along a direction which is essentially parallel to the second axis, the further first force action, the further second force action, the further third force action, and the further fourth force action being effectuated as a result of a rotation rate of the rotation rate sensor about an axis which is essentially parallel to a first axis which is essentially perpendicular to the main extension plane. It is thus advantageously made possible that a rotation rate about an axis which is essentially parallel to the first axis is detectable.

According to an example embodiment, the further first detection unit includes at least one further first electrode for detecting the further first force action on the first structure, the further second detection unit includes at least one further second electrode for detecting the further second force action on the second structure, the further third detection unit includes at least one further third electrode for detecting the further third force action on the third structure, and the further fourth detection unit includes at least one further fourth electrode for detecting the further fourth force action on the fourth structure, the further first electrode, the further second electrode, the further third electrode, and the further fourth electrode being essentially plate-shaped, the further first electrode, the further second electrode, the further third electrode, and the further fourth electrode extending essentially perpendicularly to the main extension plane and each being situated at least partially in at least one recess of the respective structure. This therefore advantageously allows for the further first force action, the further second force action, the further third force action, and the further fourth force action to be capacitively detected.

According to an example embodiment, the rotation rate sensor includes a first coupling for coupling the first structure to the second structure in such a way that the first structure and the second structure can be put into an essentially in-phase oscillation and into an oscillation essentially in phase opposition, the rotation rate sensor including a second coupling for coupling the first structure to the third structure in such a way that the first structure and the third structure can be put into an oscillation essentially in phase opposition, the rotation rate sensor including a third coupling for coupling the second structure to the fourth structure in such a way that the second structure and the fourth structure can be put into an oscillation essentially in phase opposition, the rotation rate sensor including a fourth coupling for coupling the third structure to the fourth structure in such a way that the third structure and the fourth structure can be put into an essentially in-phase oscillation and into an oscillation essentially in phase opposition. In this way, a rotation rate sensor is advantageously provided which allows for an increased certainty of detected rotation rates about one axis of rotation or about multiple axes of rotation which run perpendicularly with respect to each other by checking the plausibility of the ascertained rotation rates.

According to an example embodiment of the present invention, a method for operating a rotation rate sensor includes, in a first method step, the first structure, the second structure, the third structure, and the fourth structure being deflected essentially parallel to the drive direction with the aid of a drive signal in such a way that at a first frequency, the first structure and the fourth structure are excited to an essentially in-phase oscillation with regard to one another and to an oscillation essentially in phase opposition with regard to the second structure and to the third structure, at a second frequency, the first structure and the second structure being excited to an essentially in-phase oscillation with regard to each other and to an oscillation essentially in phase opposition with regard to the third structure and to the fourth structure. It is thus advantageously made possible to detect the deflections of the structures which are assignable to the first frequency and to the second frequency. In this way, an increased certainty of detected rotation rates about one axis of rotation or about multiple axes of rotation which run perpendicularly with respect to one another is made possible by checking the plausibility of the ascertained rotation rates.

According to example embodiment, in a second method step, at least one detection signal is ascertained with the aid of the first detection unit, the second detection unit, the third detection unit, and the fourth detection unit and/or with the aid of the further first detection unit, the further second detection unit, the further third detection unit, and the further fourth detection unit. This makes it advantageously possible for the detection signal to be provided for further method steps.

According to example embodiment, in a third method step, the at least one detection signal is processed with the aid of synchronous demodulation using the first frequency and the second frequency. This makes it advantageously possible that at least one rotation rate assignable to the first frequency and at least one rotation rate assignable to the second frequency are ascertainable with the aid of the processed detection signal.

According to example embodiment, in a fourth method step, a first rotation rate assignable to the first frequency and a second rotation rate assignable to the second frequency are ascertained from the at least one processed detection signal. In this way, an increased certainty of detected rotation rates about one axis of rotation or about multiple axes of rotation which run perpendicularly with respect to one another is made possible by checking the plausibility of the ascertained rotation rates.

According to example embodiment, the drive signal is controlled via two phase lock loops (PLLs) and two adaptive clock generators (ACGs).

DETAILED DESCRIPTION

Figure 1:
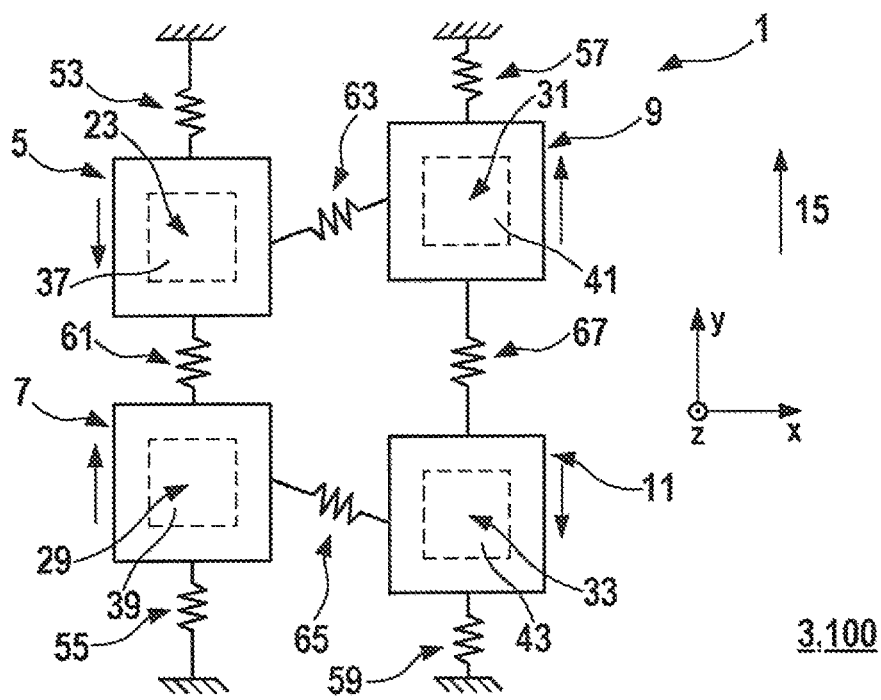
FIG. 1 shows a schematic illustration of a rotation rate sensor according to a first example embodiment of the present invention.

In the different figures, identical parts are always provided with identical reference numerals and are thus each named or mentioned generally only once.

Figure 2:
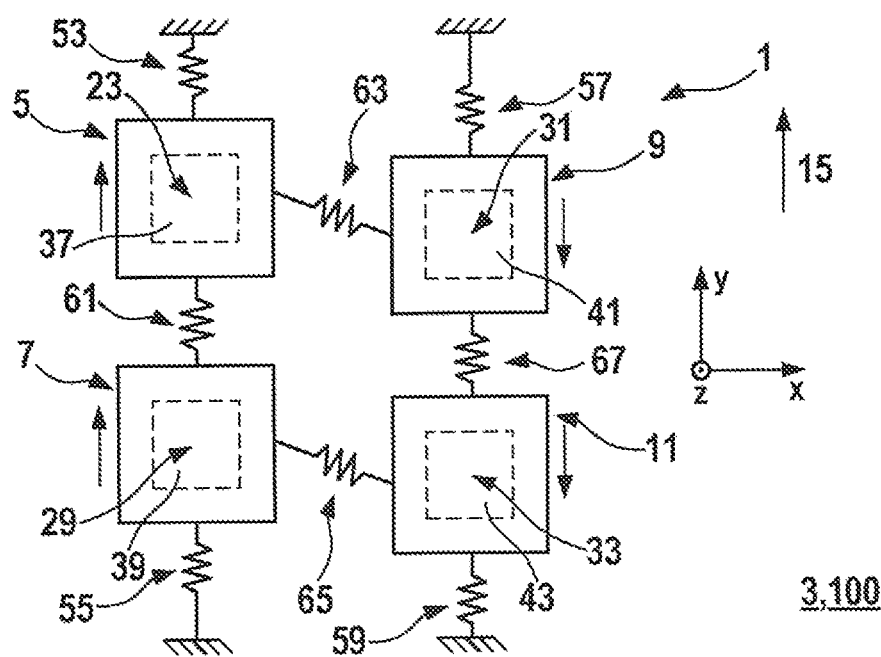
FIG. 2 shows a schematic illustration of the rotation rate sensor according to FIG. 1 in another state, according to the first example embodiment of the present invention.

FIG. 1 and FIG. 2 each shows a schematic illustration of a rotation rate sensor 1 according to a first example embodiment of the present invention, rotation rate sensor 1 including a substrate 3 having a main extension plane 100 as well as a first, a second, a third, and a fourth structure 5, 7, 9, 11 which are each movable with regard to substrate 3 and with regard to each other. Furthermore, rotation rate sensor 1 includes a drive device (not illustrated in FIG. 1 and FIG. 2) for deflecting first structure 5, second structure 7, third structure 9, and fourth structure 11 out of the particular resting positions of structures 5, 7, 9, 11 and along a direction which is essentially parallel to a drive direction 15. For this purpose, first structure 5 and fourth structure 11 are excited at a first frequency to an essentially in-phase oscillation with regard to each other and to an oscillation essentially in phase opposition with regard to second structure 7 and to third structure 9. Furthermore, first structure 5 and second structure 7 are excited at a second frequency to an essentially in-phase oscillation with regard to each other and to an oscillation essentially in phase opposition with regard to third structure 9 and to fourth structure 11. Here, FIG. 1 shows a snapshot of an oscillation at the first frequency and FIG. 2 shows a snapshot of an oscillation at the second frequency.

Rotation rate sensor 1 illustrated in FIG. 1 and FIG. 2 further includes a first detection unit 23 having a first electrode 37 for detecting a first force action on first structure 5, a second detection unit 29 having a second electrode 39 for detecting a second force action on second structure 7, a third detection unit 31 having a third electrode 41 for detecting a third force action on third structure 9, and a fourth detection unit 33 having a fourth electrode 43 for detecting a fourth force action on fourth structure 11. In this case, the first force action, the second force action, the third force action, and the fourth force action act along a direction which is essentially parallel to a first axis Z and are effectuated as a result of a rotation rate of rotation rate sensor 1 about an axis which is essentially parallel to a second axis X. First electrode 37, second electrode 39, third electrode 41, and fourth electrode 43 illustrated in FIG. 1 and FIG. 2, are essentially plate-shaped, extend parallel to main extension plane 100, and are situated at least partially between substrate 3 and the respective structure 5, 7, 9, 11.

Furthermore, rotation rate sensor 1 illustrated in FIG. 1 and FIG. 2 includes a first coupling 61, a second coupling 63, a third coupling 65, and a fourth coupling 67 for coupling particular structures 5, 7, 9, 11 in such a way that structures 5, 7, 9, 11 can be put into the above-described oscillations. For this purpose, first coupling 61 couples first structure 5 to second structure 7. Second coupling 63 couples first structure 5 to third structure 9. Third coupling 65 couples second structure 7 to fourth structure 11. Fourth coupling 67 couples third structure 9 to fourth structure 11.

Figure 3:
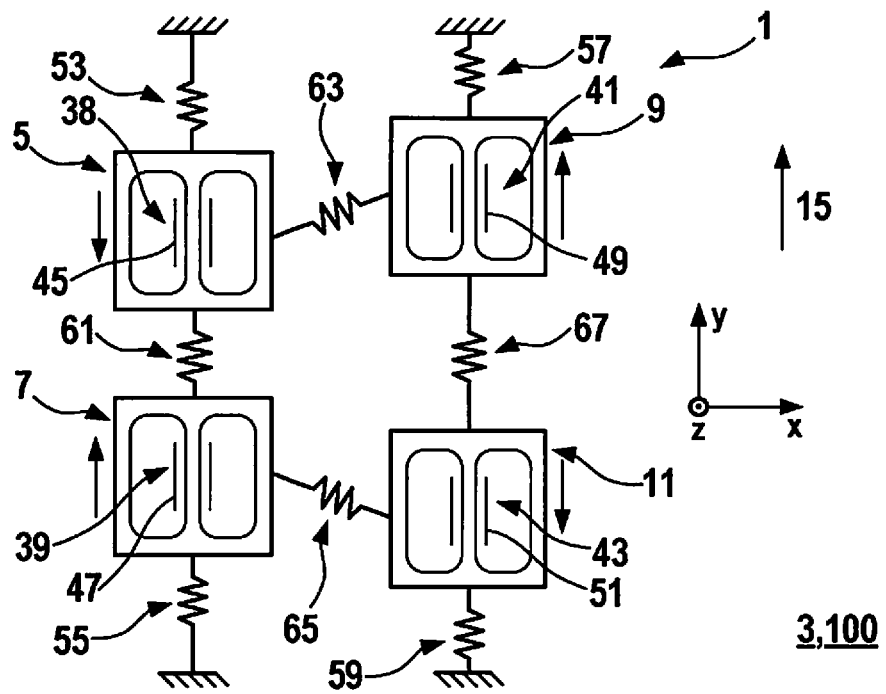
FIG. 3 shows a schematic illustration of a rotation rate sensor according to a second example embodiment of the present invention.
Figure 4:
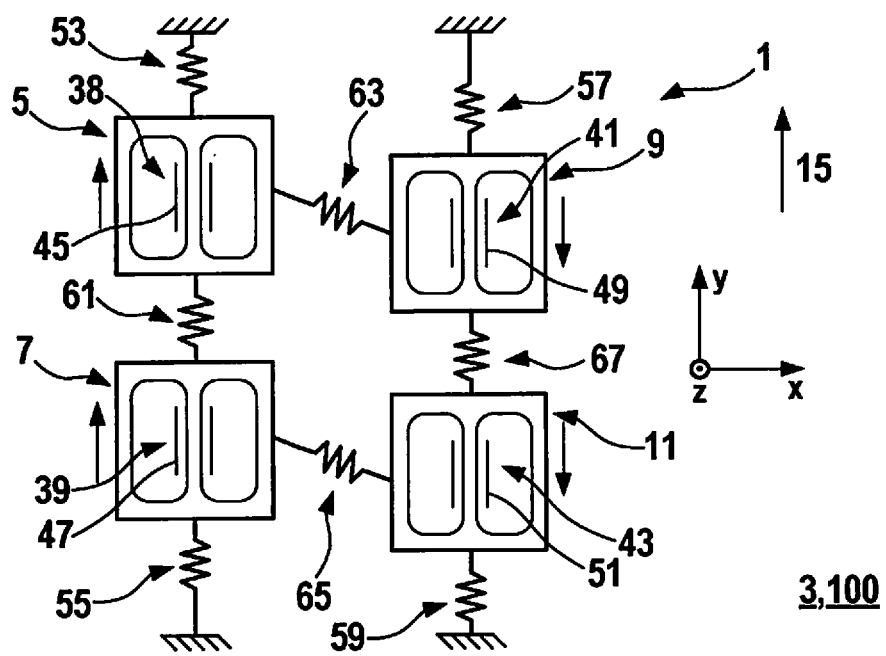
FIG. 4 shows a schematic illustration of the rotation rate sensor according to FIG. 3 in another state, according to the first example embodiment of the present invention.

FIG. 3 and FIG. 4 show in a schematic illustration a rotation rate sensor 1 according to a second example embodiment of the present invention, rotation rate sensor 1 illustrated in FIG. 3 and FIG. 4 essentially corresponding to rotation rate sensor 1 illustrated in FIG. 1 and FIG. 2. However, rotation rate sensor 1 according to FIG. 3 and FIG. 4 includes a further first detection unit 38 having two further first electrodes 45 for detecting a further first force action on first structure 5, a further second detection unit 39 having two further second electrodes 47 for detecting a further second force action on second structure 7, a further third detection unit 41 having two further third electrodes 49 for detecting a further third force action on third structure 9, and a further fourth detection unit 43 having two further fourth electrodes 51 for detecting a further fourth force action on fourth structure 11 along a direction which is essentially parallel to second axis X in each case. Here, the further first force action, the further second force action, the further third force action, and the further fourth force action are effectuated as a result of a rotation rate of rotation rate sensor 1 about an axis which is essentially parallel to first axis Z. The two further first electrodes 45, the two further second electrodes 47, the two further third electrodes 49, and the two further fourth electrodes 51 illustrated in FIG. 3 and FIG. 4, are essentially plate-shaped, extend essentially perpendicularly with respect to main extension plane 100, and are each situated at least partially in a recess of the respective structure 5, 7, 9, 11. According to the example embodiment illustrated in FIG. 3 and FIG. 4, rotation rate sensor 1 also includes first coupling 61, second coupling 63, third coupling 65, and fourth coupling 67. In the example embodiment according to FIG. 3 and FIG. 4, the coupling of first, second, third, and fourth structure 5, 7, 9, 11 through coupling 61, 63, 65, 67 corresponds to the coupling according to the specific embodiment according to FIG. 1 and FIG. 2.

It is preferably provided that rotation rate sensor 1 includes first detection unit 23, second detection unit 29, third detection unit 31, and fourth detection unit 33 as well as further first detection unit 38, further second detection unit 39, further third detection unit 41, and further fourth detection unit 43, so that a rotation rate about second axis X as well as about first axis Z is detectable according to an example embodiment of this type.

As a result of the specific embodiments described here, a rotation rate sensor 1 including oscillating masses is operated at the first frequency and at the second frequency along a direction which is essentially parallel to drive direction 15. In this case, the adjustment of the oscillation amplitude and the detection of the oscillation frequencies, or the control of the drive signal, take place at the first frequency and at the second frequency via PLL and ACG, in particular via two PLLs and ACGs. When a rotation rate is applied, the masses are subjected due to the Coriolis force to in-phase movements and movements in phase opposition as a function of the frequency. By connecting electrodes and signal processing, for example demodulation and filtering, or synchronous demodulation at the first frequency and at the second frequency, the rotation rate can be ascertained. At the first frequency, the rotation rate corresponds for example to the sum of the capacitance of first detection unit 23 and the capacitance of fourth detection unit 33 minus the sum of the capacitance of second detection unit 29 and the capacitance of third detection unit 31. At the second frequency, the rotation rate corresponds for example to the sum of the capacitance of first detection unit 23 and the capacitance of second detection unit 29 minus the sum of the capacitance of third detection unit 31 and the capacitance of fourth detection unit 33.

After adjusting the amplification factors, the rotation rates ascertained at the two frequencies should be identical in the case of an error-free operation. In this way, an increase in certainty is achieved in that the two rotation rate output signals are checked for plausibility. In the case of proper function, the ascertained rotation rates should be identical.

What is claimed is:

1. A rotation rate sensor, comprising:
   a substrate;
   a first structure that is movable relative to the substrate;
   a second structure that is movable relative to the substrate and to the first structure;
   a third structure that is movable relative to the substrate and to the first and second structures;
   a fourth structure that is movable relative to the substrate and to the first, second, and third structures; and
   a drive device to deflect each of the first, second, third, and fourth structures essentially parallel to a drive direction and out of respective resting positions of the first, second, third, and fourth structures, such that:
      at a first frequency, the first and fourth structures are excitable to an oscillation that is essentially in-phase relative to each other and essentially in phase-opposition relative to the second and third structures; and
      at a second frequency, the first and second structures are excitable to an oscillation that is essentially in-phase relative to each other and essentially in phase-opposition relative to the third and fourth structures;
   wherein the first structure is coupled to the substrate, to the second structure, and to the third structure,
   wherein the second structure is coupled to the first structure, to the substrate, and to the fourth structure,
   wherein the third structure is coupled to the substrate, to the fourth structure, and to the first structure, and
   wherein the fourth structure is coupled to the third structure, to the substrate, and to the second structure;
   a first detection unit to detect a first force action on the first structure along a direction which is essentially parallel to a first axis essentially perpendicular to a main extension plane of the substrate;

a second detection unit to detect a second force action on the second structure along a direction which is essentially parallel to the first axis;
a third detection unit to detect a third force action on the third structure along a direction which is essentially parallel to the first axis; and
a fourth detection unit to detect a fourth force action on the fourth structure along a direction which is essentially parallel to the first axis, wherein the first, second, third, and
fourth force actions are effectuated by a rotation rate of the rotation rate sensor about an axis that is essentially parallel to a second axis essentially parallel to the main extension plane;
a further first detection unit having two further first electrodes for detecting a further first force action on the first structure along a direction which is essentially parallel to the second axis;
a further second detection unit having two further second electrodes for detecting a further second force action on the second structure along a direction which is essentially parallel to the second axis;
a further third detection unit having two further third electrodes for detecting a further third force action on the third structure along a direction which is essentially parallel to the second axis; and
a further fourth detection unit having two further fourth electrodes for detecting a further fourth force action on the fourth structure along a direction which is essentially parallel to the second axis in each case;
wherein the further first force action, the further second force action, the further third force action, and the further fourth force action are effectuated as a result of a rotation rate of the rotation rate sensor about an axis which is essentially parallel to the first axis.

2. The rotation rate sensor of claim 1, wherein the first, second, third, and fourth force actions are effectuated by the rotation rate of the rotation rate sensor about the axis that is essentially parallel to the second axis essentially parallel to the main extension plane and essentially perpendicular to the drive direction.

3. The rotation rate sensor of claim 2, wherein:
the first detection unit includes at least one essentially plate-shaped first electrode that extends essentially parallel to the main extension plane, that is situated at least partially between the substrate and the first structure, and via which the first force action on the first structure is detectable;
the second detection unit includes at least one essentially plate-shaped second electrode that extends essentially parallel to the main extension plane, that is situated at least partially between the substrate and the second structure, and via which the second force action on the second structure is detectable;
the third detection unit includes at least one essentially plate-shaped third electrode that extends essentially parallel to the main extension plane, that is situated at least partially between the substrate and the third structure, and via which the third force action on the third structure is detectable; and
the fourth detection unit includes at least one essentially plate-shaped fourth electrode that extends essentially parallel to the main extension plane, that is situated at least partially between the substrate and the fourth structure, and via which the fourth force action on the fourth structure is detectable.

4. The rotation rate sensor of claim 1, wherein the first detection unit detects the first force action on the first structure along the direction that is essentially parallel to the first axis essentially parallel to the main extension plane of the substrate and essentially perpendicular to the drive direction.

5. The rotation rate sensor of claim 4, wherein:
the first detection unit includes at least one essentially plate-shaped first electrode that extends essentially perpendicularly to the main extension plane, that is situated at least partially in at least one recess of the first structure, and via which the first force action on the first structure is detectable;
the second detection unit includes at least one essentially plate-shaped second electrode that extends essentially perpendicularly to the main extension plane, that is situated at least partially in at least one recess of the second structure, and via which the second force action on the second structure is detectable;
the third detection unit includes at least one essentially plate-shaped third electrode that extends essentially perpendicularly to the main extension plane, that is situated at least partially in at least one recess of the third structure, and via which the third force action on the third structure is detectable; and
the fourth detection unit includes at least one essentially plate-shaped fourth electrode that extends essentially perpendicularly to the main extension plane, that is situated at least partially in at least one recess of the fourth structure, and via which the fourth force action on the fourth structure is detectable.

6. The rotation rate sensor of claim 1, further comprising:
a first coupling that couples the first structure to the second structure so that the first structure and the second structure can be put into respective oscillations that are essentially in-phase relative to each other and into respective oscillations that are essentially in phase-opposition relative to each other;
a second coupling that couples the first structure to the third structure so that the first structure and the third structure can be put into respective oscillations that are essentially in phase-opposition relative to each other;
a third coupling that couples the second structure to the fourth structure so that the second structure and the fourth structure can be put into respective oscillations that are essentially in phase-opposition relative to each other;
a fourth coupling that couples the third structure to the fourth structure so that the third structure and the fourth structure can be put into respective oscillations that are essentially in-phase relative to each other and into respective oscillations that are essentially in phase-opposition relative to each other.

7. A method for operating a rotation rate sensor, the method comprising:
deflecting, using a drive signal of a drive device and at a first frequency, each of a first structure, a second structure, a third structure, and a fourth structure of the sensor essentially parallel to a drive direction such that the first and fourth structures are excited to an oscillation that is essentially in-phase relative to each other and essentially in phase-opposition relative to the second and third structures; and
deflecting, using a drive signal of the drive device and at a second frequency, each of the first structure, the second structure, the third structure, and the fourth structure of the sensor essentially parallel to the drive direction such that the first and second structures are excited to an oscillation that is essentially in-phase relative to each other and essentially in phase-opposition relative to the third and fourth structures;
wherein the first structure is coupled to a substrate, to the second structure, and to the third structure,
wherein the second structure is coupled to the first structure, to the substrate, and to the fourth structure,
wherein the third structure is coupled to the substrate, to the fourth structure, and to the first structure, and
wherein the fourth structure is coupled to the third structure, to the substrate, and to the second structure;
wherein the rotation rate sensor, includes:
the substrate;
the first structure that is movable relative to the substrate;
the second structure that is movable relative to the substrate and to the first structure;
the third structure that is movable relative to the substrate and to the first and second structures;
the fourth structure that is movable relative to the substrate and to the first, second, and third structures; and
the drive device to deflect each of the first, second, third, and fourth structures essentially parallel to a drive direction and out of respective resting positions of the first, second, third, and fourth structures, such that:
at a first frequency, the first and fourth structures are excitable to an oscillation that is essentially in-phase relative to each other and essentially in phase-opposition relative to the second and third structures; and
at a second frequency, the first and second structures are excitable to an oscillation that is essentially in-phase relative to each other and essentially in phase-opposition relative to the third and fourth structures;
wherein the first structure is coupled to the substrate, to the second structure, and to the third structure, wherein the second structure is coupled to the first structure, to the substrate, and to the fourth structure, wherein the third structure is coupled to the substrate, to the fourth structure, and to the first structure, and wherein the fourth structure is coupled to the third structure, to the substrate, and to the second structure;
a first detection unit to detect a first force action on the first structure along a direction which is essentially parallel to a first axis essentially perpendicular to a main extension plane of the substrate;
a second detection unit to detect a second force action on the second structure along a direction which is essentially parallel to the first axis;
a third detection unit to detect a third force action on the third structure along a direction which is essentially parallel to the first axis; and
a fourth detection unit to detect a fourth force action on the fourth structure along a direction which is essentially parallel to the first axis, wherein the first, second, third, and fourth force actions are effectuated by a rotation rate of the rotation rate sensor about an axis that is essentially parallel to a second axis essentially parallel to the main extension plane;
a further first detection unit having two further first electrodes for detecting a further first force action on the first structure along a direction which is essentially parallel to the second axis;
a further second detection unit having two further second electrodes for detecting a further second force action on the second structure along a direction which is essentially parallel to the second axis;
a further third detection unit having two further third electrodes for detecting a further third force action on the third structure along a direction which is essentially parallel to the second axis; and
a further fourth detection unit having two further fourth electrodes for detecting a further fourth force action on the fourth structure along a direction which is essentially parallel to the second axis in each case;
wherein the further first force action, the further second force action, the further third force action, and the further fourth force action are effectuated as a result of a rotation rate of the rotation rate sensor about an axis which is essentially parallel to the first axis.

8. The method of claim 7, further comprising:
processing at least one of the detection signals with synchronous demodulation using the first frequency and the second frequency.

9. The method of claim 8, further comprising:
ascertaining, from at least one of the processed detection signals, a first rotation rate assignable to the first frequency and a second rotation rate assignable to the second frequency.

* * * * *